United States Patent [19]

Giacalone et al.

[11] Patent Number: 5,710,867
[45] Date of Patent: Jan. 20, 1998

[54] METHOD FOR PARALLEL PROCESSING OF FUZZY LOGIC INFERENCE RULES AND CORRESPONDING CIRCUIT ARCHITECTURE WITH FUZZY INPUTS AND OUTPUTS

[75] Inventors: Biagio Giacalone, Trapani; Vincenzo Catania, Agata Li Battiati; Claudio Luzzi, Acri; Vincenzo Matranga, Palermo, all of Italy

[73] Assignee: Consorzio per la Ricerca sulla Microelettronica nel Mezzogiorno, Catania, Italy

[21] Appl. No.: 431,687

[22] Filed: May 2, 1995

[30] Foreign Application Priority Data

May 23, 1994 [EP] European Pat. Off. ............ 94830240

[51] Int. Cl.$^6$ .................................................. G06G 7/00
[52] U.S. Cl. .................... 395/3; 395/61; 395/900
[58] Field of Search .................... 395/3, 26, 61, 395/900, 11

[56] References Cited

U.S. PATENT DOCUMENTS

| | | | |
|---|---|---|---|
| 5,295,226 | 3/1994 | Yamakawa | 395/3 |
| 5,412,752 | 5/1995 | Basehore et al. | 395/3 |
| 5,600,757 | 2/1997 | Yamamoto et al. | 395/3 |

FOREIGN PATENT DOCUMENTS

| | | | |
|---|---|---|---|
| 0361403 | 4/1990 | European Pat. Off. | G06F 7/60 |
| 0472921 | 3/1992 | European Pat. Off. | G05B 13/00 |
| 0594222 | 4/1994 | European Pat. Off. | G06F 7/00 |

OTHER PUBLICATIONS

European Search Report from European application No. 93830240.1.

IEEE Transactions on Fuzzy Systems, vol. 2, No. 2, May 1994, New York, pp. 93–106, Catania "A VLSI Fuzzy Inference Processor Based On A Discrete Analog Approach".

IEEE Expert, vol. 1, No. 3, 1986, New York US, pp. 55–62, Togai et al. "Expert System On A Chip Etc . . . ".

Togai, Masaki and Watanabe, Hiroyuki. "Expert System on a Chip: An Engine for Real–Time Approximate Reasoning." IEEE Expert. vol. 1, No. 3, pp. 55–62, 1986.

Watanabe, Hiroyuki and Dettloff, Wayne and Yount, Kathy. "A VLSI Fuzzy Logic Controller with Reconfigurable, Cascadable Architecture." IEEE Journal of Solid–State Circuits. vol. 25, No. 2, pp. 376–381, Apr. 1990.

Primary Examiner—Tariq R. Hafiz
Assistant Examiner—Jason W. Rhodes
Attorney, Agent, or Firm—Wolf, Greenfield & Sacks, P.C.; James H. Morris

[57] ABSTRACT

A method and system for processing a plurality of fuzzy logic rules. The system includes a plurality of fuzzy logic lines, each fuzzy logic line corresponding to one of the fuzzy logic rules and including a calculating device. Each calculating device has an input terminal for receiving a series of weights and an output terminal for outputting an overall truth value according to the received series of weights and at least one logical operator of the fuzzy logic rule corresponding to the fuzzy logic line. The system further includes processing circuitry coupled to each fuzzy logic line, for receiving the overall truth value from each line, and outputting a fuzzy logic value according to the received overall truth values.

26 Claims, 4 Drawing Sheets

METHOD FOR PARALLEL PROCESSING OF FUZZY LOGIC INFERENCE RULES AND CORRESPONDING CIRCUIT ARCHITECTURE WITH FUZZY INPUTS AND OUTPUTS

BACKGROUND OF THE INVENTION

1. Field of the Invention

The present invention relates to a method for calculation in parallel of multiple fuzzy logic inference rules.

The present invention also concerns a circuit architecture having fuzzy inputs and outputs for implementation of the above method.

Specifically, the present invention relates to a method for parallel processing of multiple fuzzy logic inference rules organized in fuzzy sets or logical functions of multiple fuzzy sets including membership functions defined in a discourse universe and the rules being configured essentially as IF-THEN rules with at least one antecedent preposition and at least one consequent implication and each preposition including at least one term of comparison between the membership functions and a plurality of input data and the terms being separated by logical operators.

2. Discussion of the Related Art

Fuzzy logic is a technique capable of supplying solutions for broad classes of control problems for which conventional techniques, e.g. those based on Boolean logic, have proven unsuited for providing acceptable performance at acceptable cost.

Fuzzy logic supplies a method of modelling the "inaccurate" modes of reasoning typical of the human mind which play, however, an essential role in the human ability to make decisions under conditions of uncertainty.

Fuzzy logic operates on a linguistic description of reality using a particular class of variables termed "linguistic variables." To each variable may be syntactically joined a set of dependent values which may take on different meanings depending on the context in which they are employed. The values are found starting from a primary term which represents the variable, from one of its contraries, and from a series of modifiers of the primary term, e.g. as described in European Patent Application No. 92830095.3.

Furthermore, each value assigned to a linguistic variable is represented by a fuzzy set, i.e. a possibilistic distribution function which links each value of the variable in the corresponding definition domain known also as the universe of discourse.

The functions which identify a fuzzy set in the universe of discourse of a variable are called membership functions. The assembly of all the fuzzy sets of a linguistic variable is called a "term set."

Membership functions are defined by a sample representation obtained by dividing the definition domain in m points and the interval [0, 1] in 1 levels.

At present, definition or memorization in a fuzzy logic based electronic controller of the membership functions which identify the fuzzy sets represents one of the major restraints on development of new fuzzy logic applications and thus limits the theoretical potential of this methodology.

Indeed, if for implementation on hardware of the membership functions it is desired that the membership functions reflect the semantics of the fuzzy concept so as to obtain a correct incidence of a term in a rule, one is forced to use a considerable amount of memory space. This makes fuzzy logic advantageous only for those applications where the term set of the linguistic variable consists of a reduced number of membership functions.

The data for a membership function are normally stored in a memory word. In known devices, the memory area occupied is thus negatively influenced by the amount of data necessary for defining these membership functions.

In many cases, it has proven sufficient to memorize triangular membership functions, generally not symmetrical, or at most trapezoid membership functions so as to reduce the amount of data necessary for their memorization.

With triangular or trapezoid membership functions as described above, it is not necessary to memorize the values of the function at all the points of the universe of discourse. Rather, it is sufficient to memorize only (1) the points where the curve changes slope, and (2) the value of this slope.

Among the membership functions, appropriate logical operations called "inferential", which allow description of the behavior of a system with the change in input parameters are performable. These operations are performed using fuzzy rules which generally have a syntax of the following type:

IF X IS A, THEN Y IS B where X is the input value, A and B are membership functions which represent system knowledge, and Y is the output value.

The part of the rule preceding the term "THEN" is called the "left" or "antecedent" part, while the part of the rule following the term "THEN" is called the "right" or "consequent" part of the inference rule. The implication between the antecedent part and the consequent part of a fuzzy rule is governed by two laws:

(1) modus ponens: in it the truth of the implication, i.e. of the consequent part of the rule depends on that of the premise, i.e., the antecedent part of the rule; and (2) modus tollens: in it occurrence of the implication which ensures correctness of the premise.

Adopting the modus ponens as the rule, the degree of truth of the entire rule cannot be greater than that of the antecedent part.

Since the antecedent part can be made up of one or more terms T corresponding to hypotheses of the type (F is F') on the data F and on the membership functions F', its overall degree of truth which we shall indicate by the symbol $\Omega$ in the following description depends on the inference operations on these same terms T.

In addition, the overall degree of truth $\Omega$ takes on a determinate value by applying these terms T to the logical operators AND, OR and NOT.

The electronic data processing tools which allow performance of this type of operation must be provided with a particular architecture expressly dedicated to the set of inference operations which constitute the fuzzy logic computational model.

In a processor operating with fuzzy logic procedures, there must be room for a circuit capable of calculating the overall degree of truth $\Omega$ regardless of the logical operators present.

Heretofore, multivalue fuzzy logic inferences were calculated in different ways.

In the project developed at the OMRON by T. Yamakawa et al., the inference processing circuit can operate analogically in parallel only on four rules whose antecedent part can have at most three terms.

In addition to this initial limitation, for design simplicity, other constraints were imposed:

(1) the terms T of the antecedent part of the rules can be separated only by logical operators AND;

(2) the membership functions Γ of the term sets of the input variables I can have only an S, Z, trapezoid or triangular shape; and (3) the inputs are deterministic, i.e. they correspond to an individual point P in the universe of discourse U.

The architecture of H. Watanabe et al. performs in parallel all the rules for the same output variable. The user is, however, limited in his choice of the variables with which he can work. These can be only four input variables and two output variables out of fifty-one rules, or two input variables and one output out of one hundred two rules.

A plurality of Watanabe circuits can be connected in cascade under control of a software program to process more than one hundred two rules. In this case, it is possible to introduce a feedback of the output signal on the input of one of the components. In like manner circuits of this type can be connected to operate with a larger number of input variables. These architectures, however, involve a dramatic increase in the silicon area occupied by the memories.

A third known solution consists of the Fuzzy Micro Controller of Neural Logix in which are used only symmetrical and linear membership functions (triangles, trapezoids, etc.). Since each antecedent part of a rule can contain up to a maximum of sixteen terms, there are sixteen fuzzifiers at the input of this circuit.

With reference to triangular or trapezoid membership functions FA, by weight $f$ of a set of data I for an antecedent part term T represented in the universe of discourse U by means of a membership function Γ is meant the greatest value of the intersection between the input data set I and the membership function Γ corresponding to said term T.

The Neural Logix circuit can process up to sixty-four rules. At input there can be applied the variables to be controlled or the feedback output variables.

In this processing circuit, a neuronal network performs the smallest of the sixteen terms contained in the antecedent part of the rule. Among the overall degrees of truth $\Omega$ of all sixty-four antecedent parts, the maximum value is calculated by a circuit consisting of a single register which is continually updated on the basis of each evaluation of the weight of each antecedent part.

Lastly, a processor known in trade as 'WARP' and manufactured by the same applicant processes sequentially up to two hundred fifty-six rules whose antecedent parts are made up of four terms.

The architecture of the inferential part was designed to calculate the degree of truth of the premise by parallel computation on four $\alpha$ values. These weights $\alpha$ are taken simultaneously from the data memory once the input variables are known.

In the case of rules whose antecedent parts contain more than four terms T separated by logical operators the processing is carried out by dividing the antecedent parts in several antecedent sub-parts, each of which contains four terms in the antecedent part allowing for the partial truth level w of each antecedent sub-part obtained by a feedback to the inference calculation circuit.

All the circuits heretofore available to the technicians of the industry cannot be considered absolutely effective because their efficacy depends heavily on the type of application.

In particular, the architectures, which give priority to parallel processing of the inference rules in such a manner as to gain processing time, lose necessarily in occupied silicon area.

On the other hand, reduction of the occupied memory area by a decrease in the number of computational units causes efficiency of parallel processing to depend heavily on the number of rules associated with each individual inference operation.

Actually, if all the inferences to be processed are characterized by the same number of fuzzy rules $N_{FR}$ there can be a less than optimal use of available resources each time the number of processing units $N_{PU}$ present in the architecture is not exactly a submultiple of the number of fuzzy rules $N_{FR}$. In this case the following relationship is not verified:

$$N_{FR} \bmod N_{PU} = 0$$

i.e., $N_{FR}$ is not evenly divisible by the number $N_{PU}$.

In practice, it is not always possible to introduce a number of inferential units equal to the number of the rules describing the process. Typically one is forced to oversize or undersize the calculation structure.

The technical problem underlying the present invention is to identify a new parallel processing method for multiple fuzzy rules which would not depend on the number of terms making up the antecedent part of the rules or the logical operators linking them.

SUMMARY OF THE INVENTION

The solution ideal underlying the present invention is to provide simultaneous processing of several rules which could be configured dynamically in a flexible manner on the basis of the characteristics of the different applications for which the circuit might be designed.

On the basis of this solution idea, the technical problem is solved by means of a parallel processing method adopting a modular set of repeatable structures.

One aspect of the invention is a method of parallel processing multiple fuzzy logic inference rules organized in fuzzy sets or logical functions of multiple fuzzy sets that include corresponding membership functions defined in a universal of discourse. The inference rules are configured essentially as IF-THEN rules with at least one antecedent and at least one consequent, each antecedent and consequent having at least one term of comparison between the membership functions and a plurality of input data, the terms being separated by logical operators. The method includes the steps of (a) calculating a weight of each term of the antecedent of each fuzzy logic inference rule, the weight being the greatest value of an intersection between the set of input data and the corresponding membership functions, and (b) determining overall truth levels of the fuzzy logic inference rules according to the calculated weight of each term.

Another aspect of the invention is directed to a circuit for parallel processing of multiple fuzzy logic inference rules of the type. The circuit includes at least one inferential unit; at least one data bus; and at least one union block, wherein the inferential unit has a modular structure and includes a plurality of identical inferential processing lines connected in parallel between the data bus and the union block. Each individual inferential processing line is capable of processing a fuzzy logic inference rule.

The characteristics and advantages of the method and apparatus in accordance with the present invention are set forth in the description of an embodiment thereof given below by way of non-limiting example with reference to equipment illustrated in the annexed drawings.

DETAILED DESCRIPTION

Figure 1A:
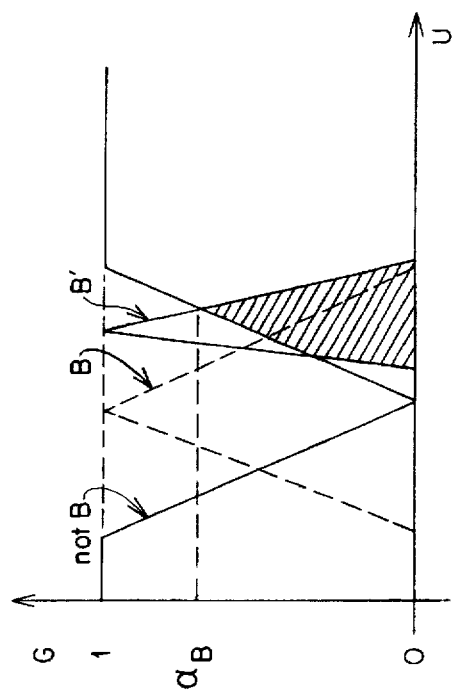
FIGS. 1A–1D show membership functions Γ of a possible term set and a set of input data I which may be used to illustrate the teachings of the invention.
Figure 1B:
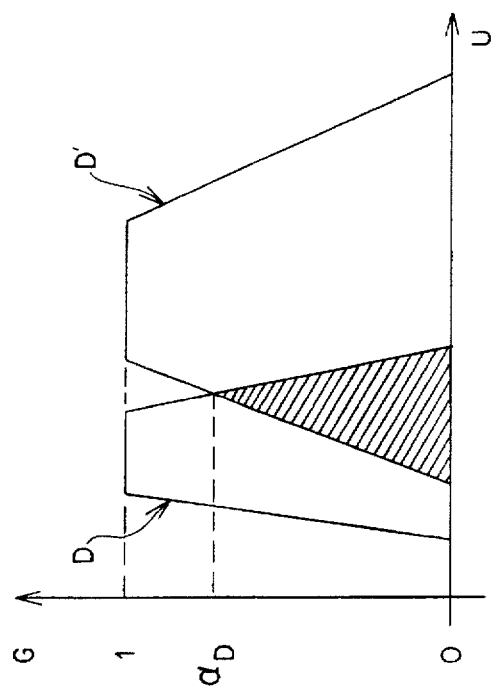
Figure 1C:
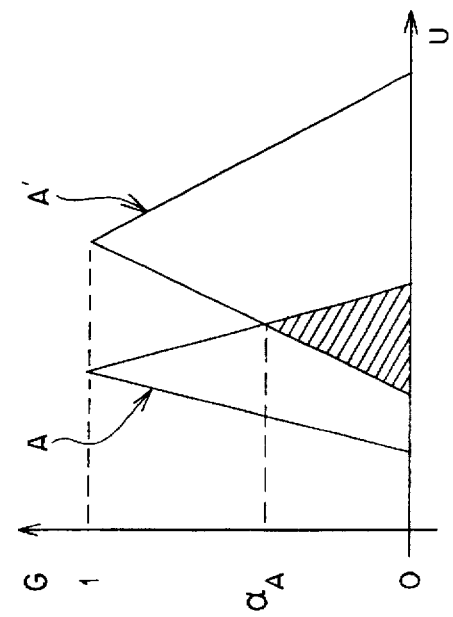
Figure 1D:
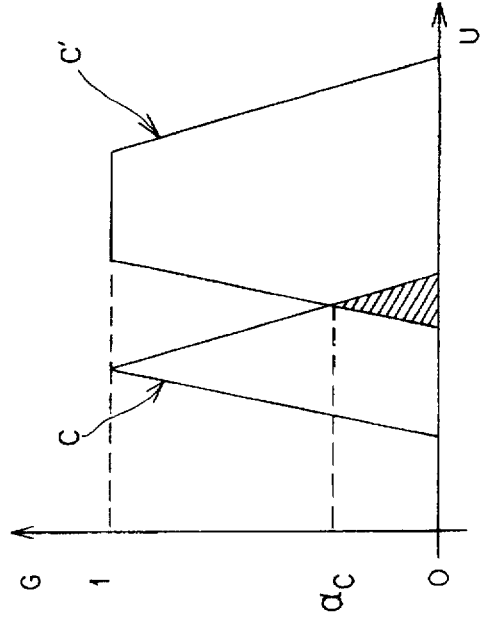

With reference to FIGS. 1A–1D a membership function Γ of a linguistic or logical variable M is represented by a vectorial system where along the abscissa axis is defined a universe of discourse U while along the ordinate axis is defined a degree of truth or membership G. The input data I are represented by the same reference system.

In FIGS. 1A–1D are shown four membership functions Γ which identify in the universe of discourse U as many fuzzy sets which are part of a term set. In FIGS. 1A–1D are indicated also the weights $_I$ of each term T of an inference rule R, i.e. the highest value of the intersection between the set of input data I and the membership function Γ corresponding to said term T.

In practice, the input variables I can be reduced to a single value P in the universe of discourse U (then termed a "crisp" input). In these cases, the truth level $\alpha_j$ of each term $T_j$ is nothing but the value of the membership function Γ corresponding to that predetermined input value P.

The method in accordance with the present invention calls for the use of a new inferential unit which allows inferential processing of a number of fuzzy logic inference rules Nr each of which can be made up of a number of antecedent terms Na with a single consequent term.

This unit operates on fuzzy inputs and, for each point of the universe of discourse U, receives the greatest value of the intersection between the input data I and the corresponding membership functions Γ.

By way of example, let us consider a rule R1 formed as follows (the consequent part is not shown):

IF (A is A') AND (NOT B is B') OR NOT [(C is C') AND (D is D')] THEN . . .

The antecedent part of this rule R1 is made up of four terms $T_j$ (placed between the parentheses) and takes on a value determined by applying thereto the logical operators present AND, OR and NOT.

In the graphs of FIGS. 1A–1D are shown the weights $_A'_B$ $_C$ and $_D$ for the four terms $T_j$:

$\alpha_A = \max\ [\min\ (A, A')]$, $\alpha_B = \max\ [\min\ (\text{not } B, B')]$, $\alpha_C = \max\ [\min\ (C, C')]$, and $\alpha_D = \max\ [\min\ (D, D')]$.

In fuzzy logic semantics, with the operators AND and OR are associated, respectively, minimum and maximum operations between two or more elements, while with the operator NOT is associated a complementary operation, for one in the universe U.

The operations for the two calculation stages, in which the method in accordance with the present invention is divided for processing of a fuzzy logic inference rule R, are the following:

(1) the weight α of each term T of the antecedent part of the fuzzy logic inference rule R is estimated, and (2) the overall degree of truth Ω of the rule R is updated. After calculating the overall degree of truth Ω for the antecedent part of the fuzzy rule the method proceeds with computation of the consequent part of said rule.

The method in accordance with the present invention provides for simultaneous (pipeline) processing of these calculation stages. In the time employed for calculation of the overall degree of truth Ω of a rule R of a given sequence of rules, there is determined the weight a' of the terms T' following the antecedent part of the rule R.

When all the rules for the same inference have been processed, the method provides for composition of a fuzzy logic output Y by supplying a level of truth for each point of the universe of discourse U.

The computation unit is thus compatible with itself since it operates on fuzzy inputs and produces outputs of the same type which can be used directly as inputs of another inferential unit of the same type or defuzzified.

Figure 2:
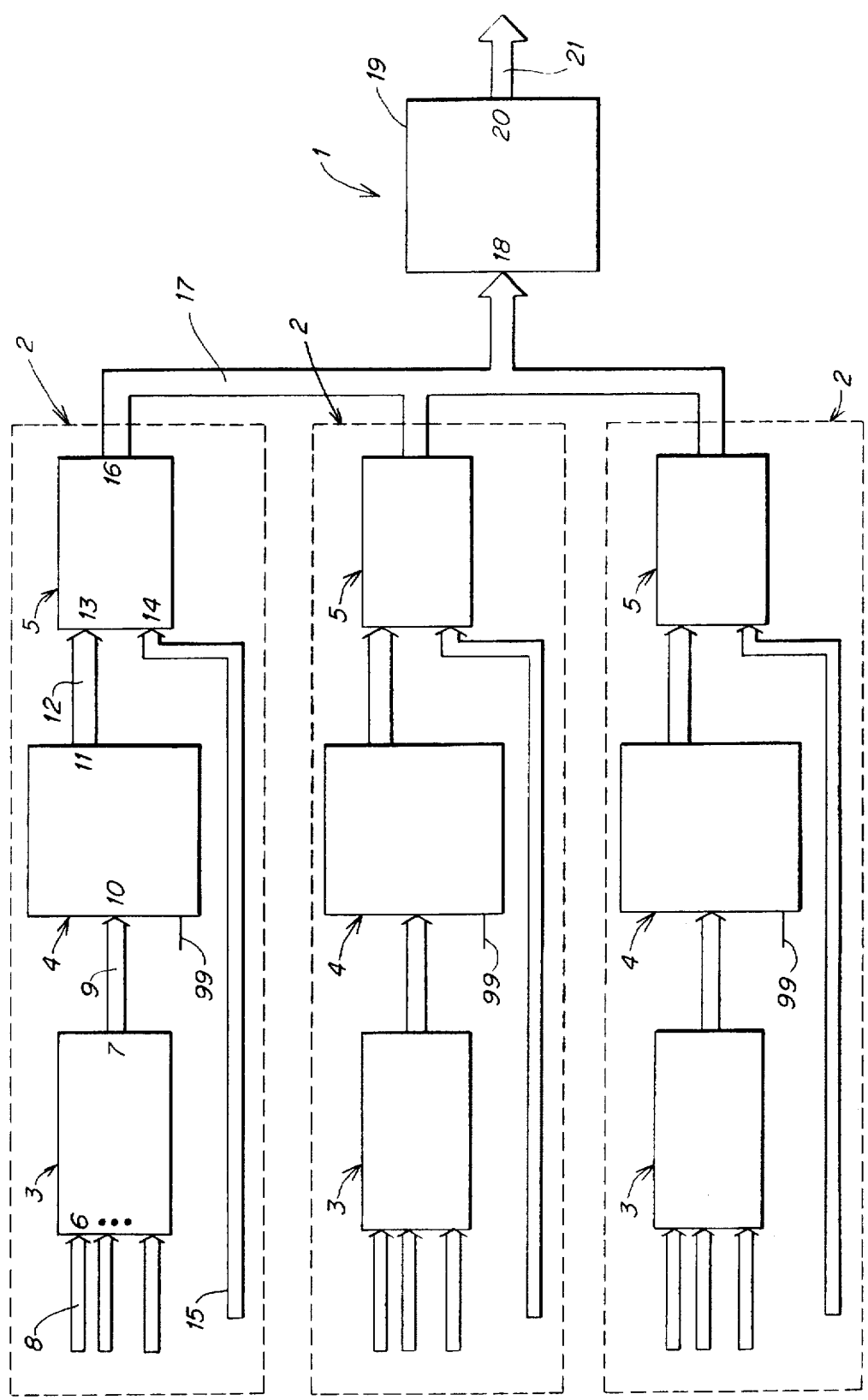
FIG. 2 shows schematically a circuit architecture provided in accordance with the invention for implementation of the multiple fuzzy rule parallel processing method.

FIG. 2 shows schematically an example of circuitry architecture designed for parallel processing of multiple fuzzy logic inference rules.

The circuitry architecture of FIG. 2 includes an inferential unit 1 with modular structure and including a plurality of same lines 2 for inferential processing connected in parallel in a number equal to the fuzzy logic inference rules Ri to be processed simultaneously.

Each inferential processing line 2 provides computation of a fuzzy logic inference rule Ri and comprises a first evaluation block 3, a second calculator block 4 and a third processing block 5 for the membership functions of the consequent part based on the value of the output of the calculator block 4.

The evaluation block 3 has a plurality of inputs 6 and one output 7. The inputs 6 receive through a plurality of busses 8 the values of the terms T of the antecedent part of the fuzzy logic inference rule R.

The output 7 is connected through the bus 9 to an input 10 of the calculator block 4 and supplies the weight α of the terms T of the antecedent part of the fuzzy logic inference rule R.

The calculator block 4 has an output 11 connected through the bus 12 to a first input 13 of the processing block 5. The output 11 supplies the overall truth level Ω of the antecedent part of the fuzzy logic inference rule R.

The processing block 5 has an input 14 which receives through the bus 15 the membership functions Xi which characterize the consequent part of the fuzzy logic inference rule R.

Furthermore, the processing block 5 has an output 16 connected through bus 17 to an input 18 of another block 19 for union. The outputs 16 of the processing blocks 5 supply the value of the membership functions of the consequent part processed starting from the value coming from the calculator block 4.

The union block 19 has an output 20 which supplies through bus 21 the fuzzy logic value Y of the group of Nr fuzzy logic inference rules Ri for a description variable of the physical universe which is the object of the study developed by the inferential unit 1.

Figure 3:
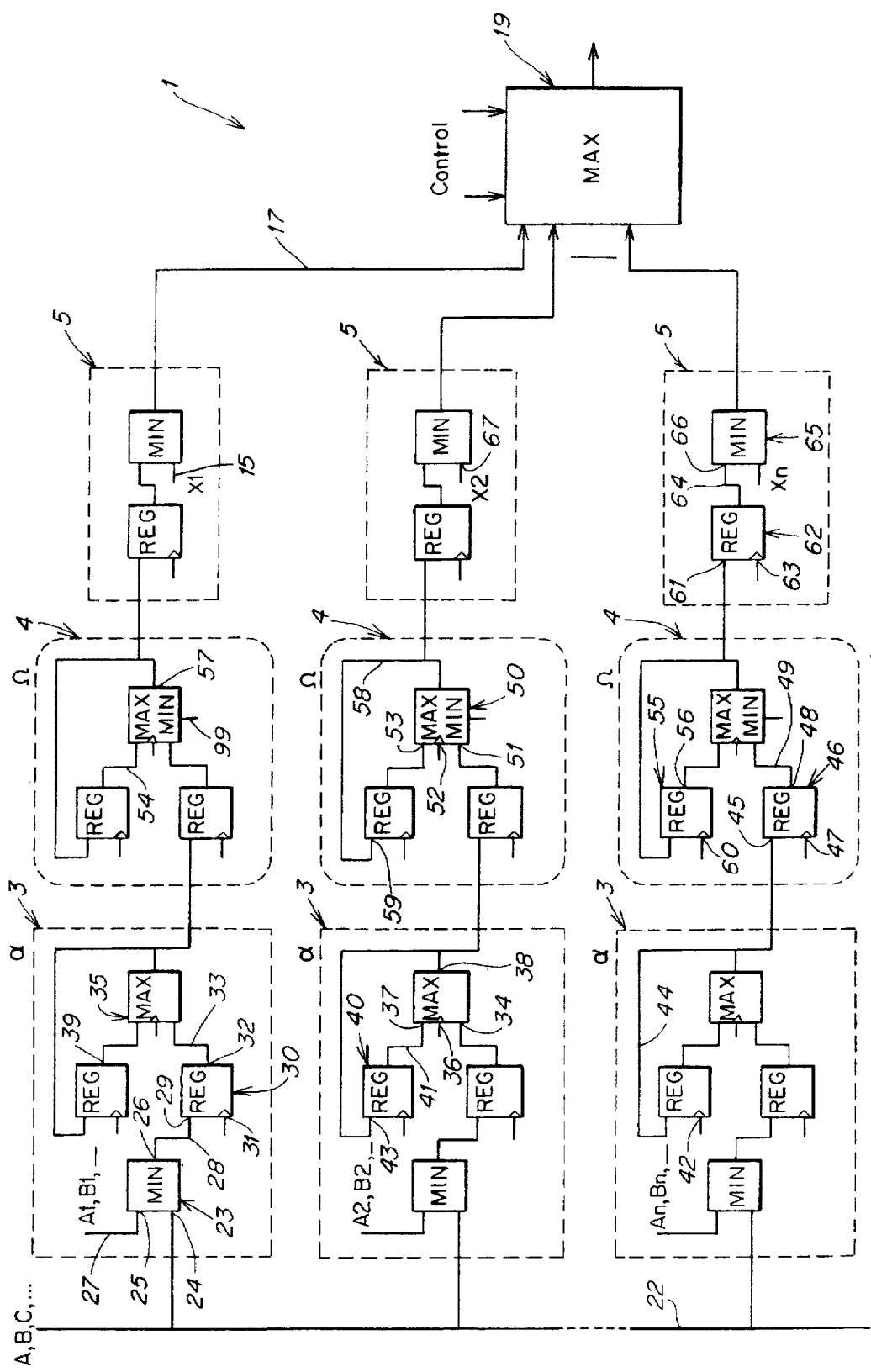
FIG. 3 shows in greater detail the circuitry architecture of FIG. 2.

FIG. 3 shows in greater detail a first embodiment of a circuit of the diagram proposed in FIG. 2.

In the proposed embodiment, reference is made to the defuzzification method denominated 'Max-Min' which operates by cutting off the membership function. The circuitry architecture, in accordance with the present invention, can still be applied in the presence of other conventional defuzzification methods.

In the example of FIG. 3, the data which were present on the busses 8 of FIG. 2 are conveyed by a single bus 22 on which travel the system input variables A, B, C . . . . The evaluation block 3 includes a first minimizer block 23 which has two inputs 24 and 25 and one output 26. The input 25 of the minimizer block 23 receives, through bus 22, the input data A while the input 24 receives, through bus 27, the membership functions Ai for the linguistic variable A and, in like manner, the linguistic variables B, C, etc.

The output 26 is connected through the bus 28 to an input 29 of a sliding register 30. The sliding register 30 receives, on a second input 31, a clock signal CK and has an input 32 connected through the bus 33 to a first input 34 of another maximizer block 35.

The maximizer block 35 has 3 inputs 34, 36 and 37 and one output 38. The second input 36 of the maximizer block 35 receives the clock signal CK while the third input 37 is connected through the bus 41 to an output 39 of another sliding register 40.

The sliding register 40 has two inputs 42 and 43. The first input 42 receives the clock signal CK while the second input 43 is connected through the bus 44 to the output 38 of the maximizer block 35.

The output 38 of the maximizer block 35 is connected to a first input 45 of a first sliding register 46 included in the calculator block 4o The sliding register 46 receives on another input 47 the clock signal CK and has an output 48 connected through the bus 49 to a first input 51 of a maximinimizer block 50.

The maximinimizer block 50 receives on a second input 52 the clock signal CK and has a third input 53 connected through the bus 54 to an output 56 of another sliding register 55 and an output 57 connected through the bus 58 to a first input 59 of the sliding register 55. A second input 60 of the sliding register 55 receives the clock signal CK.

The output 57 of the maximinimizer block 50 is connected to an input 61 of another sliding register 62 which receives at a second input 63 the clock signal CK and is connected in cascade through the bus 64 to a first input 66 of a minimizer block 65. The minimizer block 65 receives on a second input 67 through the bus 15 the membership functions Xi which characterize the consequent part of the fuzzy logic inference rule R. The minimizer block 65 is connected in a cascade manner through the bus 17 to the union block 19.

The operation of the circuitry architecture will now be discussed. The bus 22 carries the system input variables (A, B, C . . . ). For each point, where the universe of discourse is divided, the variables are compared in parallel with the respective values of the membership functions for linguistic variables A1, A2 . . . AN.

At the end of this first processing phase, which is performed a number of times equal to the number of points of discretization of the universe of discourse U on the bus 44 at the output of the first evaluation block 3, there is the weight $\alpha_i$ of the first term Ai of the antecedent part of the fuzzy logic inference rule Ri.

The invention then proceeds to evaluation of the weight $_B$ for the second antecedent term B of all the rules related to the membership functions B1, B2 . . . BN.

Each value $\alpha_A$ is supplied to the second calculator stage 4 which compares it with the weight $\alpha_{Ai}$ for the previous term of the antecedent part on the basis of the logical operation AND or OR present in the fuzzy logic inference rule Ri. A control signal that defines the logical operations may be supplied to the calculating device 4 by, for example, line 99. Based on this comparison, there is calculated the partial truth level $\Omega$, and the overall truth level $\Omega$ is updated.

The system proceeds in accordance with this sequence until all the terms Ti present in the antecedent part of the fuzzy logic inference rule Ri have been processed.

At the end of the process, on each line 12 (see FIG. 2) are present the overall truth levels $\Omega$ of every fuzzy logic inference rule R processed, while on each inferential processing line 2 is present the processed value of the membership functions of the consequent part.

In accordance with the method of the present invention, this circuitry architecture allows parallel processing of multiple fuzzy rules with a high level of configurability.

Indeed, reconfiguration mechanisms capable of adapting the system to the characteristics of the application can be introduced. Indeed, the number of inferential processing lines 2 (Nr) depends essentially on the processing in question. Hence, in accordance with the user's choices, it is possible to configure the structure in the desired manner.

It is also possible to group the Nr simultaneously processable rules from each individual computation unit depending on the exigencies of the moment.

The further structure configuration flexibility may be achieved by sending on the bus 15 the data Xi for the membership functions of the terms of the consequent part of appropriately selected sets of rules.

The circuitry diagram of FIG. 3 operates on rules in which a level of priority among logical operators has not been instituted.

Figure 4:
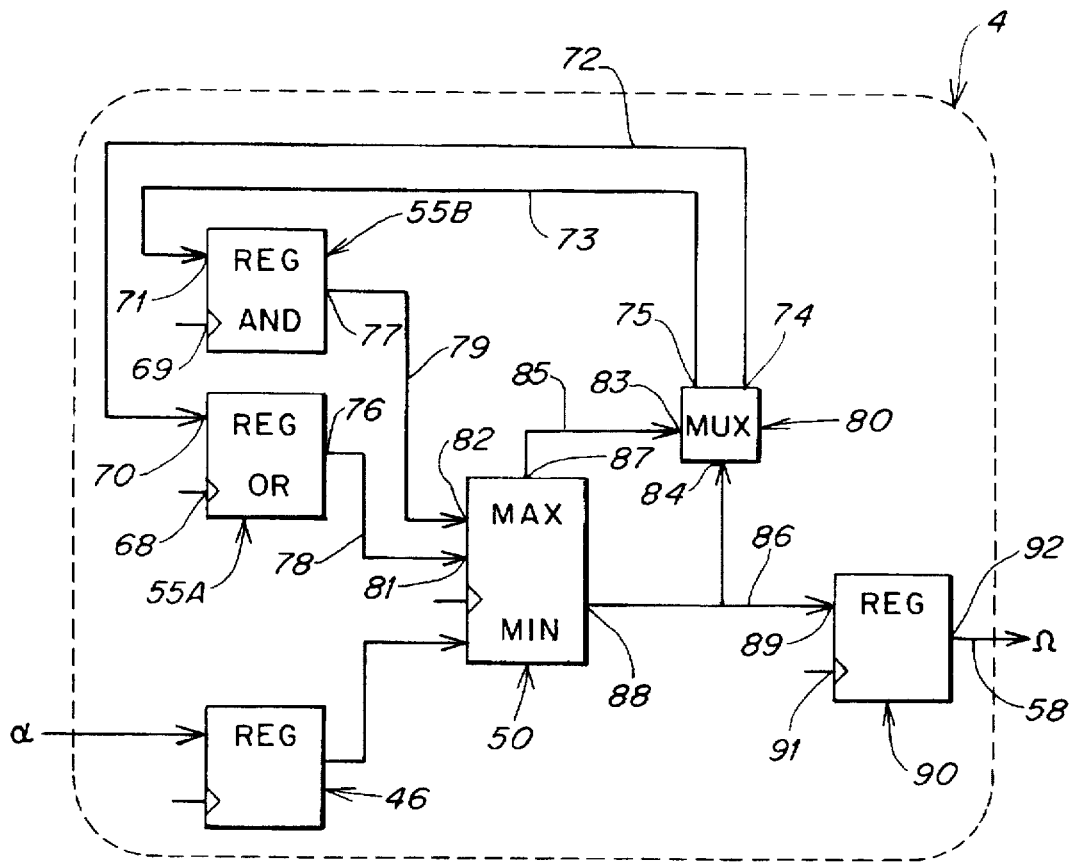
FIG. 4 shows a variant embodiment of a detail of the architecture of FIG. 3.

It is possible to allow for a priority among these logical operators by means of a circuit in which the sliding register 55 in the calculator block 4 is doubled to allow separately for the values deriving from OR or AND logical operations. FIG. 4 shows an alternative embodiment of the calculator block 4 in which it is possible to define a priority among the logical operators. In the circuit of FIG. 4 the sliding register 55 is split into an OR register 55A and an AND register 55B.

These registers 55A (OR) and 55B (AND) receive at an input, 68 and 69 respectively, the clock signal CK. A second input, 70 and 71 respectively, is connected through the busses 72 and 73 to respective outputs 74 and 75 of a path selector 80 (MUX). The outputs 76 and 77 of the registers 55A (OR) and 55B (AND) are connected through busses 78 and 79, respectively, to inputs 81 and 82 of the maximinimizer block 50.

The path selector 80 (MUX) has two inputs 83 and 84 connected through the busses 85 and 86, respectively, to two outputs 87 and 88, respectively, of the maximinimizer block 50. The output 88 of the maximinimizer block 50 is connected to a first input 89 of a sliding register 90 which receives on a second input 91 the clock signal CK.

The sliding register 90 has an output 92 connected through the bus 58 to the input of processing block 5 for the membership functions of the consequent part.

With the circuitry structure of FIG. 4 it is possible to calculate the partial truth levels w for the logical operation with the higher priority level to compare them later in accordance with the logical operation with the lower priority level. The path selector 80 (MUX) permits separation in the corresponding registers of the partial truth levels w for OR or AND logical operators.

Lastly, it is possible to insert input and output blocks which allow the structure to operate on deterministic magnitudes. The input circuit is reduced to a simple block which, given the deterministic input, produces a fuzzy output with a single, substantially crisp, value.

In like manner the output circuit is a defuzzifier circuit which transforms a fuzzy value into a deterministic output. This transformation can be adapted to the accuracy required for the type of application.

The proposed circuitry diagram is compatible with itself, i.e. it exhibits inputs and outputs of the fuzzy type or, by introduction of appropriate input and output blocks, of the deterministic type.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of parallel processing multiple fuzzy logic inference rules organized in fuzzy sets or logical functions of multiple fuzzy sets that include corresponding membership functions defined in a universe of discourse, said inference rules being configured essentially as IF-THEN rules with at least one antecedent and at least one consequent, each antecedent and consequent having at least one term of comparison between the membership functions and a plurality of input data, the terms being separated by logical operators, the method comprising the steps of:

A. evaluating, in parallel, the antecedents of the fuzzy logic inference rules, the step of evaluating including steps of:

calculating a weight of each term of the antecedent of each fuzzy logic inference rule, the weight being the greatest value of an intersection between the set of input data and the corresponding membership functions, and generating a series of partial truth levels for each fuzzy logic inference rule according to the calculated weight of each term of the antecedent of each fuzzy logic inference rule, wherein the last partial truth level in the generated series of partial truth levels for each fuzzy logic inference rule is considered to be an overall truth level for that fuzzy logic inference rule, and wherein at least one of the partial truth levels of at least one of the fuzzy logic inference rules is based on an OR logical operation; and B. providing a fuzzy logic signal based on the overall truth level for each of the fuzzy logic inference rules.

2. The method of claim 1 wherein the step calculating the weight of each term of the antecedent of each fuzzy logic rule includes the step of:

calculating the intersection at all points of the universe of discourse.

3. The method of claim 1 wherein the step of generating includes the step of:

successively updating, for each fuzzy logic inference rule, a register with each of the series of partial truth levels for that fuzzy logic inference rule.

4. The method of claim 3 wherein the step of calculating and the step of generating occur simultaneously for at least two of the fuzzy logic inference rules.

5. The method of claim 1 wherein the step of generating includes the step of:

presenting at least one of the overall truth levels as a fuzzy value.

6. The method of claim 1, wherein the logical operators OR, AND and NOT of the terms of comparison are associated with a maximum, minimum and complementary operation, respectively.

7. A circuit for parallel processing of multiple fuzzy logic inference rules of the type, the circuit comprising:

at least one inferential unit;

at least one data bus; and at least one union block, wherein the inferential unit has a modular structure and includes a plurality of identical inferential processing lines connected in parallel between the data bus and the union block, each individual inferential processing line being capable of processing a fuzzy logic inference rule so that a series of intermediate truth levels is generated for each fuzzy logic inference rule, wherein the last of the series of intermediate truth levels generated for each fuzzy logic inference rule is considered to be an overall truth level for that rule, wherein at least one of the intermediate truth levels of at least one of the fuzzy logic inference rules is based on an OR logical operation, and wherein the union block provides a fuzzy logic output based on the overall truth level for each fuzzy logic inference rule.

8. The circuit of claim 7, wherein each of the inferential processing lines includes:

an evaluation block, a calculator block, and a processing block for processing membership functions to generate an output indicative of the consequent parts of the fuzzy logic inference rules.

9. The circuit of claim 8 wherein the evaluating, calculating, and processing blocks are connected in series.

10. The circuit of claim 9, wherein the evaluation block of each inferential processing line receives the values of the terms of the antecedent part of the fuzzy logic inference rule to be processed, and supplies the weights of said terms.

11. The circuit of claim 9, wherein the calculator block of each inferential processing line receives the weights of the terms of the antecedent part of the fuzzy logic inference rule to be processed and supplies the series of intermediate truth levels for one of the fuzzy logic inference rules.

12. The circuit of claim 9, wherein the processing block for processing the membership functions of each inferential processing line receives the series of intermediate truth levels of the fuzzy logic inference rule and the membership functions, the membership functions defining the consequent part of the fuzzy logic inference rule, and supplies an activation level of the processed fuzzy logic inference rule.

13. The circuit of claim 8, wherein each evaluation block includes at least one first minimizer block, at least one first sliding register, at least one second maximizer block and at least one second sliding register.

14. The circuit of claim 13 wherein the at least one minimizer block, at least one first sliding register, and at least one second maximizer block are connected in series, and wherein the at least one second sliding register has an output connected to an input of the maximizer block and has an input connected to an output of the maximizer block.

15. The circuit of claim 8, wherein each calculator block includes at least one first sliding register, at least one maximinimizer block, and at least one second sliding register.

16. The circuit of claim 15, wherein the at least one first sliding register and at least one maximinimizer block are connected in series, and wherein the at least one second sliding register has an output connected to an input of the maximinimizer block and has an input connected to an output of the maximinimizer block.

17. The circuit of claim 15, wherein the calculating block includes a path selector, a maximinimizer block, and two registers, each register having an input connected to the path selector and an output connected to an input of the maxi-minimizer block.

18. The circuit of claim 17, wherein the path selector has at least two inputs connected to at least two outputs of the maximinimizer block.

19. The circuit of claim 8, wherein each processing block for processing the membership functions of the consequent part includes at least one sliding register and at least one minimizer block.

20. The circuit of claim 19, wherein the at least one sliding register and at least one minimizer block are connected in series, and wherein the at least one minimizer block receives values of the membership functions which define the consequent part of the fuzzy logic inference rule.

21. A fuzzy logic system for processing a plurality of fuzzy logic rules, the fuzzy logic system comprising:

a plurality of fuzzy logic lines, each fuzzy logic line corresponding to one of the plurality of fuzzy logic rules and including a calculating device, each calculating device having an input terminal for receiving a series of weights and an output terminal for outputting a series of intermediate truth values, a last intermediate truth value in the series being considered as an overall truth value according to the received series of weights and at least one logical operator of the fuzzy logic rule corresponding to the fuzzy logic line, wherein at least one of the plurality of fuzzy logic rules includes a logical OR operator so that at least one of the intermediate truth values is based on an OR operation associated with the logical OR operator; and processing circuitry coupled to each fuzzy logic line, for receiving the overall truth value from each line, and outputting a fuzzy logic value according to the received overall truth values.

22. The system of claim 21, wherein each calculating device includes a control terminal for receiving a control signal defined by the at least one logical operator of the fuzzy logic rule corresponding to the fuzzy logic line.

23. The system of claim 22, wherein each line further includes:

an evaluating device coupled to the calculating device, the evaluating device having a first input terminal for receiving a set of series of input values, a second terminal for receiving a set of membership functions, and an output terminal coupled to the input terminal of the calculating device for providing the series of weights, each weight being determined according to one of the series of input values and one of the set of membership functions.

24. A fuzzy logic system for processing a plurality of fuzzy logic rules, the fuzzy logic system comprising:

a plurality of fuzzy logic lines, each fuzzy logic line corresponding to a fuzzy logic rule and including:

an evaluating device that serially provides at least one weight of terms of an antecedent of the rule corresponding to the fuzzy logic line, a calculating device that provides a series of intermediate partial truth values according to the at least one weight of terms serially provided by the evaluating device, wherein the last intermediate partial truth value in the series is considered an overall truth value, and wherein at least one fuzzy logic rule includes an OR logical operator such that at least one overall truth value is based on an OR logical operation, and a processing device that provides a processed signal based on the overall truth and a consequent of the rule; and a union device that receives, in parallel, the processed signal provided by each fuzzy logic line, and provides a fuzzy logic signal based on the processed signal provided by each fuzzy logic line.

25. The fuzzy logic system of claim 24, wherein each calculating device includes a maximinimizer device a first input, a second input, and an output that is feedback coupled to the second input so that, when in operation, the maximinimizer device can provide one of a maximum and a minimum of a first weight that is previously received on the first input and presently received on the second input, and a second weight that is presently received on the second input.

26. The fuzzy logic system of claim 24, wherein each calculating device of operates simultaneously with other calculating devices so that the union device receives at least two processed signals simultaneously.

\* \* \* \* \*